United States Patent
Oehry et al.

(10) Patent No.: US 12,149,173 B2
(45) Date of Patent: Nov. 19, 2024

(54) MULTIPHASE DC-DC CONVERTER AND METHOD FOR CONTROLLING A MULTIPHASE DC-DC CONVERTER

(71) Applicant: BRUSA HyPower AG, Sennwald (CH)

(72) Inventors: Peter Oehry, Wittenbach (CH); Adrian Immler, Buchs (CH); Martin Erler, Dornbirn (AT)

(73) Assignee: BRUSA HyPower AG, Sennwald (CH)

( * ) Notice: Subject to any disclaimer, the term of this patent is extended or adjusted under 35 U.S.C. 154(b) by 256 days.

(21) Appl. No.: 17/761,230

(22) PCT Filed: Sep. 16, 2020

(86) PCT No.: PCT/EP2020/075909
§ 371 (c)(1),
(2) Date: Mar. 17, 2022

(87) PCT Pub. No.: WO2021/053038
PCT Pub. Date: Mar. 25, 2021

(65) Prior Publication Data
US 2022/0368233 A1    Nov. 17, 2022

(30) Foreign Application Priority Data
Sep. 19, 2019   (EP) .................................... 19198468

(51) Int. Cl.
*H02M 3/158*    (2006.01)
*H02M 1/00*    (2006.01)
(Continued)

(52) U.S. Cl.
CPC ....... *H02M 3/1586* (2021.05); *H02M 1/0009* (2021.05); *H02M 1/0058* (2021.05); *H02M 1/14* (2013.01); *H02M 1/44* (2013.01)

(58) Field of Classification Search
CPC .... H02M 3/1582; H02M 3/156; H02M 3/157; H02M 3/1584; H02M 3/1586;
(Continued)

(56) References Cited

U.S. PATENT DOCUMENTS 8,575,911 B2 * 11/2013 Cheng ................. H02M 3/1588
                                                      323/283
9,106,132 B2 *  8/2015 Liu ........................ H02M 3/156
(Continued)

OTHER PUBLICATIONS

Ryan et al., "Digital Closed-Loop Control Strategy to Maintain the Phase Shift of a Multi-Channel BCM Boost Converter for PFC Applications", Jul. 2019, IEEE vol. 34 No. 7, pp. 7001-7012 (Year: 2019).*
(Continued)

*Primary Examiner* — Jeffrey A Gblende
(74) *Attorney, Agent, or Firm* — Hoffmann & Baron, LLP

(57) ABSTRACT

A method for controlling a multiphase DC-DC converter with two or more phase circuits, each with a switch arranged to control an inductor current through an inductor, the phase circuit is arranged to generate a phase current contributing to a total current to be delivered to an output side of the multiphase DC-DC converter. The method includes switching two or more of the phase circuits in Boundary Conduction Mode to generate interleaved phase current pulses, with a period length and a nominal turn-on time period of the switch; and, in at least one of the two or more of the phase circuits being switched, and for successive phases, repeatedly adapting the turn-on time period for controlling the length of the pulses of the inductor current to minimise a difference from the period length.

13 Claims, 3 Drawing Sheets

(51) Int. Cl.
*H02M 1/14* (2006.01)
*H02M 1/44* (2007.01)

(58) Field of Classification Search
CPC .... H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 1/08; H02M 3/1588; H02M 7/5395; H02M 1/14; H02M 1/0043; H02J 3/46; H02J 3/38
See application file for complete search history.

(56) References Cited

U.S. PATENT DOCUMENTS 9,488,995 B2 * 11/2016 Deboy .................. H02M 3/285
10,727,735 B2 * 7/2020 Bhandarkar ........ H02M 3/1584
2009/0257257 A1 10/2009 Adragna et al.
2014/0334196 A1 11/2014 Chen et al.
2022/0131467 A1 * 4/2022 Hosotani ............. H02M 1/0083

OTHER PUBLICATIONS

Grote et al., "Digital Control Strategy for Multi-Phase Interleaved Boundary Mode and DCM Boost PFC Converters", IEEE, Sep. 17, 2011, pp. 3186-3192; Cited in the International Search Report.
Huber, et al., "Closed-Loop Control Methods for Interleaved DCM/CCM Boundary Boost PFC Converters", IEEE, Feb. 15, 2009, pp. 991-997; Cited in the International Search Report.
Ku et al., "A Novel SFVM-M3 Control Scheme for Interleaved CCM/DCM Boundary-Mode Boost Converter in PFC Applications", IEEE Transactions on Power Electronics, Aug. 1, 2011, vol. 26, No. 8; pp. 2295-2303; Cited in the International Search Report.
European Office Action dated Apr. 11, 2023, Application No. 19198468.1; 5 pages.
Ryan, "Digital Closed-Loop Control Strategy to Maintain the Phase Shift of a Multi-Channel BCM Boost Converter for PFC Applications", IEE Transactions on Power Electronics, Jul. 7, 2019, vol. 34, No. 7, pp. 7001-7012.

* cited by examiner

MULTIPHASE DC-DC CONVERTER AND METHOD FOR CONTROLLING A MULTIPHASE DC-DC CONVERTER

BACKGROUND OF THE INVENTION

Field of the Invention

The invention relates to the field of electronic power converters, and in particular to a multiphase DC-DC converter and a method for controlling a multiphase DC-DC converter.

Description of the Related Art

FIG. 1 shows a prior art boost converter for unidirectional power transfer from an input side with input voltage $U_E$, input capacitance $C_E$ and input current $I_E$ to an output side with output voltage $U_A$, output capacitance $C_A$ and output current $I_A$, an inductor or choke with an inductance value $L_S$, carrying an inductor current $I_L$, a diode with diode current $I_D$ and a switch between a bridge point and a common terminal, the voltage between the bridge point and the common terminal being $U_S$. The switch is a semiconductor switch, for example a MOSFET switch. The input capacitance filters the inductor current, resulting in the input current being the mean value of the inductor current. The output capacitance filters the diode current, resulting in the output current being the mean value of the diode current.

FIG. 1 also shows the relevant voltages and currents over time, illustrating the commonly known Continuous Conduction Mode (CCM) in which the inductor current remains above zero. In the Discontinuous Conduction Mode (DCM), not illustrated, in periods of time when the switch is open ($U_S(t)$ being essentially equal to $U_A$) the inductor current drops to zero and remains at zero for a certain period of time, until the switch is closed again. Closing the switch clamps the voltage at the bridge point to zero and causes the inductor current to rise again. In the Boundary Conduction Mode (BCM, also called Transition mode), not illustrated, the goal is to close the switch when the inductor current has dropped to zero, thereby eliminating the period of time in which it remains at zero. In order to control the circuit in boundary mode, it is necessary to measure the inductor current.

It is known to combine such converters in parallel, creating a multiphase DC-DC converter. The separate phases must be controlled to generate and add interleaved current pulses at the output side, in order to reduce the ripple in the resulting output current. In the CCM, the current in the different inductors must also be controlled to evenly distribute the current over the phases, and to avoid that the current rises to arbitrarily large values. Depending on requirements on the dynamics of the current, corresponding current sensors in each phase must have a correspondingly high bandwidth. Switching losses occur both when turning on an turning off the switches.

U.S. Pat. No. 7,884,588 B2 discloses a DC-DC converter with two or more phases and addresses the issue of the phases having different electrical parameters: in this case, if each phase is operated in BCM, then they will run with different switching frequencies, and a ripple current resulting from the addition of all phases currents will vary strongly. The solution proposed is to determine the phase that has the lowest switching frequency when operated in BCM, and to operate the remaining phases with the same frequency, and in DCM. Optionally, in order to reduce capacitive losses, U.S. Pat. No. 7,884,588 B2 proposes to delay power switch turn-on times in each phase. This comes at the cost of an increased input current ripple, since the phase shift between the individual input currents is no longer optimal.

A multiphase DC-DC converter can be structured as in FIG. 2, with, for example, two or more phase circuits generating interleaved current pulses.

SUMMARY OF THE INVENTION

It is therefore an object of the invention to create a multiphase DC-DC converter and a method for controlling a multiphase DC-DC converter, which overcomes one or more of the disadvantages mentioned above.

These objects are achieved by a multiphase DC-DC converter and a method for controlling a multiphase DC-DC converter according to the corresponding independent claims.

In the method for controlling a multiphase DC-DC converter, the multiphase DC-DC converter is arranged for exchanging electrical power between an input side an output side, the multiphase DC-DC converter including two or more phase circuits,
each phase circuit including a switch and an inductor, the switch being arranged to control an inductor current $I_L$ through the inductor,
the phase circuit being arranged to generate a phase current contributing to a total current to be delivered to an output side of the multiphase DC-DC converter. The method comprises:
  switching two or more of the phase circuits in Boundary Conduction Mode (BCM) to generate interleaved phase current pulses, with a period length T and a nominal turn-on time period $t_{on}$ of the switch;
  in at least one of the two or more of the phase circuits being switched, and for successive phases, repeatedly adapting the turn-on time period $t_{on}$ for controlling the length of the pulses of the inductor current $I_L$ to minimise a difference from the period length T.

As a result, it is possible, by interleaving the phase current pulses generated by the phase circuits, to reduce the ripple in the output current, and at the same time to operate as many of the phase circuits as desired in Boundary Conduction Mode (BCM). Operation in BCM, as opposed to DCM operation, reduces switching losses and EMC disturbances. Furthermore, as opposed to CCM operation, it eliminates the issue of the current rising to arbitrarily large values.

The period length T and the turn-on time period $t_{on}$ for each phase circuit can be adapted in order for the sum of the interleaved phase currents to conform to a required total current. The period length T should be the same for all phase circuits, since their current pulses are to be interleaved. The turn-on time period $t_{on}$ would be the same if the phase circuits had identical electrical parameters. In reality, variations of these parameters, especially of inductances, will cause the phase circuits to have different change ratios in their phase currents. This again would cause them not to operate in BCM if they all were operated with the same values for their turn-on time period $t_{on}$. Controlling the turn-on time period $t_{on}$ individually for each phase allows to perform BCM operation even if the initial or nominal turn-on time period $t_{on}$ does not cause the inductor current $I_L$ to return to exactly zero at after the period length T—as it theoretically should.

Adapting, in subsequent switching periods, the turn-on time period $t_{on}$ according to the deviation of the actual zero crossing time from the desired zero crossing time (determined by the period length T) synchronises the phase circuits.

In embodiments, the control method includes determining the period length T by operating one of the phase circuits, called master phase, with a turn-on time period $t_{on}$ that is determined according to a mean current to be delivered by this phase circuit, and operating one or more of the remaining active phase circuits to adapt their timing and period length to that of the master phase. That is, the remaining active phase circuits adapt their turn-on time periods $t_{on}$ so that they achieve the period length T determined by the master phase. Alternatively, a controller determines a prescribed period length T and an initial value for the turn-on time periods $t_{on}$ according to a mean current to be delivered by each active phase circuit, and operates all the active phase circuits to adapt their turn-on time periods $t_{on}$ in order to achieve the prescribed period length T.

The period length T and turn-on time period $t_{on}$ in each phase circuit can thus be determined by calculation, given the mean current to be delivered. Controlling the phase circuit with this period length T and turn-on time period $t_{on}$ will ideally result in the mean current to be delivered, without the need for a current measurement in the respective phase. This eliminates the need for a current sensor that returns quantitative current measurements, as opposed to a sensor that only detects whether a threshold has been crossed.

In reality, the actual mean current may not have the exact value prescribed by the mean current to be delivered. However, this will lead to a control deviation in a signal that is affected from the mean current, and a controller for that signal can adjust the mean current to be delivered accordingly. Typically, this can be done by the controller having an integral part.

A supervisory control loop can input the total current to be delivered e.g. from a total current set point, corresponding to the required total current that is to be delivered by the multiphase DC-DC converter. If the total current set point is not reached, the supervisory control loop can adapt the total current to be delivered. Thereby deviations of the actual parameters of the phase circuits from the nominal values can be compensated for.

When operating a phase circuit in BCM, the respective switch is turned on, thereby starting a current pulse, just after the inductor current $I_L$ has returned to zero, at a zero crossing time. There is no substantial time period in which the inductor current $I_L$ is zero, as would be the case in Discontinuous Conduction mode (DCM).

The number of phase circuits to be active can be chosen depending on a required total current to be delivered to the output side, and on the maximum and minimum current that can be delivered by each phase circuit. The minimum current depends on the voltage ratio, the maximum allowed frequency and the shortest possible turn-on time period $t_{on}$. The maximum current depends on the maximal current that can be carried by the inductor, upper branch switching unit, in particular a diode of the branch switching unit, and by the switch, with a safety margin, e.g., for controllability. Within these bounds, the number of phase circuits being active can be chosen. Furthermore, the number can be chosen for the current per phase circuit to be in a range where the circuit's efficiency, or another criterion, is optimal.

The exact method for determining the number of phase circuits to be active is outside the scope of the present invention which addresses, among others, the issues of operating a given number of active phase circuits, and changing the number of active phase circuits.

In embodiments, the multiphase DC-DC converter is arranged for exchanging electrical power between an input side, including a first input terminal and a second input terminal, and an output side, including a first output terminal and a second output terminal, the multiphase DC-DC converter including two or more phase circuits, each phase circuit including an inductor connected between the first input terminal and a bridge point, a upper branch switching unit connected between the bridge point and the first output terminal, and a switch with a parallel freewheeling diode connected between the bridge point and the second input terminal and second output terminal.

Therein, the control method comprises the steps of,
determining a number N of phase circuits to be active;
determining an initial value for a turn-on time period $t_{on}$;
determining a period length T;
for at least one of the phase circuits that are to be active;
turning on the switch of the phase circuit, causing an inductor current $I_L$ and the switch to increase over time, and determining a target turn-on time when the switch shall be turned on the next time;
after the turn-on time period $t_{on}$, switching off the switch, causing the inductor current $I_L$ to flow through the upper branch switching unit and decrease over time;
after the current through the inductor has returned to zero, at a zero crossing time, turning the switch on again and repeating the above steps;
when repeating the above steps, controlling the turn-on time period $t_{on}$ by increasing the turn-on time period $t_{on}$ if the zero crossing time is before the target turn-on time and by decreasing the turn-on time period $t_{on}$ if the zero crossing time is after the target turn-on time.

In embodiments, the step of determining the initial value for the turn-on time period $t_{on}$ includes computing the turn-on time period $t_{on}$ so that a mean current $I_{mean}$ through the inductor with inductance L is equal to a given value. This value can be determined by a supervisory control loop, e.g., from a total current set point, corresponding to the required total current that is to be delivered by the multiphase DC-DC converter. In subsequent operation of the converter, the turn-on time period $t_{on}$ is adapted. The initial value can be used for feedforward control. This can improve dynamic performance when the required current changes.

In embodiments, the initial value for the turn-on time period $t_{on}$ of a phase circuit is computed as $$t_{on} = \frac{2 \cdot I_{mean} \cdot L}{U_{IN}}$$

wherein $U_{IN}$ is the voltage at the input side, L is the inductance value of the inductor and $I_{mean}$ is the mean current to be delivered by the phase circuit.

In this way, the mean current to be delivered can be approximated without the need of actually having to measure the inductor current, or another current, during operation of the converter by a quantitative measurement. If the real inductance (which is not known) conforms to the inductance value L of the inductor (which is a nominal value, stored in the controller), then the real mean current will essentially match the mean current to be delivered. If it does not, then the difference can be eliminated by a controller that prescribes the mean current to be delivered.

In embodiments, in the active phase circuits, the respective period length T is computed as $$T = t_{on} \frac{U_{OUT}}{U_{OUT} - U_{IN}}$$

wherein $U_{OUT}$ is the voltage at the output side.

The resulting period length T is a function of the actual input and output values, which can be measured, and the turn-on time period $t_{on}$, which in turn is a function of the mean current to be delivered, taking into account that the target is to operate in BCM.

In embodiments, the step of determining the target turn-on time includes computing the target turn-on time as being offset from a reference time by the period length T divided by the number N of phase circuits that are active.

The target turn-on time for the next period can be computed before or after the switch is turned on, depending on circumstances. The reference time can be determined by a master phase or by a controller that determines a prescribed period length T, as described above.

In embodiments, the step of turning the switch on again includes one of
- monitoring the voltage across the switch and turning on the switch when the voltage across the switch is zero;
- monitoring the voltage across the switch, and turning on the switch a predetermined time delay after the voltage across the switch falls under a predetermined threshold;
- monitoring the inductor current $I_L$ and turning on the switch when the inductor current $I_L$ becomes zero after having been negative due to a reverse current through the upper branch switching unit;
- monitoring the current through the upper branch switching unit, in particular a diode current, and turning on the switch when this current becomes zero after having been negative due to a reverse current through the upper branch switching unit.

This allows to determine a time for at least approximately zero voltage switching using a qualitative signal, i.e. determining when a value crosses a threshold.

In embodiments, the inductor current $I_L$ is measured by measuring a magnetic field of the inductor. This can be done, for example, by means of a Hall element.

In embodiments, the step of turning the switch on again includes
- when the inductor current $I_L$ has returned to zero, letting the current reverse its direction and continue to flow through the inductor and the upper branch switching unit until the upper branch switching unit is turned off and the inductor current $I_L$ commutates to the freewheeling diode;
- turning on the switch.

This allows for zero voltage switching of the switch.

In embodiments, the upper branch switching unit is constituted by a diode, or includes a diode, and is turned off by a reverse charge in the diode having built up, and in wherein a reverse charge of the diode is chosen so that the reverse current through the diode is sufficient to discharge capacitances between the bridge point and the second input terminal.

In embodiments, the upper branch switching unit is constituted by a diode, or comprises a diode. A diode acts as a passive switch. It switches on and off depending on the current flowing through it. In such embodiments, the upper branch switching unit can be turned off by a reverse charge in the diode having built up. The reverse charge of the diode can be chosen so that the reverse current through the diode is sufficient to discharge the capacitances between the bridge point and the second input terminal.

In embodiments, the upper branch switching unit is constituted by an active switch, or includes an active switch. An active switch switches on and off depending on the state of a control signal. In such embodiments, the upper branch switching unit can be actively turned off when at a point in time at which the capacitances between the bridge point and the second input terminal have been discharged.

In embodiments, the voltage across the switch is at least approximately zero at the same time when the inductor current $I_L$ after flowing through the freewheeling diode in its forward direction has reversed its direction, driven by the input voltage, and returned to zero. This allow for zero current switching in addition to zero voltage switching.

In embodiments, for increasing the number N of phase circuits that are active to N+1, given a total current set point, the method comprises:
- in a pre-transition period of length Tpi, switching the switches of the N phase circuits to turn on at turn-on times, relative to this period, of 0, dTpi, 2·dTpi, 3·dTpi ... (N−1)·dTpi where dTpi=Tpi/N;
- computing, for a post-transition period of length Tsi, target turn-on times for the N+1 phase circuits, relative to this period, as 0, dTsi, 2·dTsi, 3·dTsi ... N·dTsi where dTsi=Tsi/(N+1);
- in a transition period, switching the switches of the N phase circuits to turn on at the same turn-on times, relative to this period, as in the pre-transition period;
- in the transition period, for each of the N phase circuits, setting the turn-on time periods $t_{on}$ so that the current returns to zero at the respective target turn-on time in the post-transition period;
- in the transition period, after the turn-on time at (N−1)·dTpi, turn on the switch of the newly operated (N+1)th at a time and with e turn-on time period $t_{on}$ such that a deviation of the total current of all phase circuits in the transition period and the post-transition period from the total current set point is (at least approximately) minimised.

This allows to include an additional phase circuit in the operation of the multiphase DC-DC converter, with a minimum effect on the quality of the total current. This in turn can be part of adapting to a load change: if a higher total is required, an additional phase circuit can be activated in this way, which first reduces the mean current delivered by each phase circuit. Subsequently, the mean current in each phase circuit can be increased, thereby increasing the total current.

In embodiments, for decreasing the number N of phase circuits that are active to N−1, given a total current set point, the method includes:
- in a pre-transition period of length Tpd, switching the switches of the N phase circuits to turn on at turn-on times, relative to this period, of 0, dTpd, 2·dTpd, 3·dTpd (N−1)·dTpd where dTpd=Tpd/N;
- computing, for a post-transition period of length Tsd, target turn-on times for the N−1 phase circuits, relative to this period, as 0, dTsd, 2·dTsd, 3·dTsd ... (N−2)·dTsd where dTsd=Tsd/(N−1);
- in a transition period, switching the switches of the N phase circuits to turn on at the same turn-on times, relative to this period, as in the pre-transition period;
- in the transition period, for each of the N phase circuits, except for the phase circuit whose target turn on time relative to this period is dTpd, setting the turn-on time periods $t_{on}$ so that the current returns to zero at the respective target turn-on time in the post-transition period;

in the transition period, for the phase circuit whose target turn on time relative to this period is dTpd, setting the turn-on time period $t_{on}$ for one last pulse of this phase circuit such that a deviation of the total current of all phase circuits in the transition period and the post-transition period from the total current set point is (at least approximately) minimised.

This allows to remove a phase circuit in the operation of the multiphase DC-DC converter, with a minimum effect on the quality of the total current. In analogy to in the above, this can be part of adapting to a load change, for providing a lower total current: first, the mean current in each active phase circuit is reduced, then one of the phase circuits is deactivated, which increases the mean current in each of the remaining phase circuits.

In embodiments, for a transition between operation of the multiphase DC-DC converter in discontinuous conduction mode to boundary conduction mode, for one or more pairs of phase circuits, the method comprises:

operating the respective two phase circuits of that pair to generate alternating current pulses of the same shape, each of these two phase circuits generating pulses and periods with zero current of equal length, the length being the period length T;

switching one of the respective two phase circuits off and generating current pulses with the period length T in boundary conduction mode by the other one of the two phase circuits.

This allows to switch from DCM to BCM, thereby reducing the number of active phase circuits by a factor of two. The same principle can be applied—if the number of phase circuits is large enough—for a factor of three or more.

In embodiments, the method includes, for a transition between operation of the multiphase DC-DC converter in discontinuous conduction mode to boundary conduction mode, for one or more sets of np phase circuits each, np being two or more, for each of these sets operating the respective np phase circuits of the set in discontinuous conduction mode to generate a sequence of np pairwise adjacent current pulses of period length T, each phase circuit contributing one of the current pulses of the sequence;

not operating the respective np phase circuits of the set in discontinuous conduction mode, and instead operating one phase circuit in boundary conduction mode to continue the sequence of current pulses of period length T.

The phase circuit that finally operates in boundary condition mode can be one of the phase circuits that first operated in discontinuous conduction mode, or another one.

Several such sequences, each generated by one such set of np phase circuits, can be interleaved.

In embodiments, for a transition between operation of the multiphase DC-DC converter in boundary conduction mode to discontinuous conduction mode, for one or more pairs of phase circuits, the method comprises:

not operating one of the respective two phase circuits and generating current pulses with the period length T in boundary conduction mode by the other one of the two phase circuits;

at a point in time when the current is zero, switching to discontinuous conduction mode by operating both of the respective two phase circuits of that pair to generate alternating current pulses of the same shape, each of these two phase circuits generating pulses and periods with zero current of equal length, the length being the period length T.

This allows to switch from BCM to DCM, thereby increasing the number of active phase circuits by a factor of two. The same principle can be applied—if the number of phase circuits is large enough—for a factor of three or more.

In embodiments, the method includes, for a transition between operation of the multiphase DC-DC converter in boundary conduction mode to discontinuous conduction mode, for one or more sets of np phase circuits each, np being two or more, for each of these sets operating one phase circuit in boundary conduction mode to generate a sequence of current pulses with period length T in boundary conduction mode;

not operating this one phase circuit in boundary conduction mode, and instead operating the respective np phase circuits of the set to continue the sequence of current pulses of period length T by operating the np phase circuits in discontinuous conduction mode to generate a sequence of np pairwise adjacent current pulses of period length T, each phase circuit contributing one of the current pulses of the sequence.

The phase circuit that first operates in boundary condition mode can be one of the phase circuits that then operate in discontinuous conduction mode, or another one.

The multiphase DC-DC converter comprises a controller including voltage sensors arranged for determining the voltage $U_{IN}$ at the input side, the voltage $U_{OUT}$ at the output side and the voltage $U_L$ across the inductor of each phase circuit, the controller being configured to perform the method described herein.

In embodiments, the multiphase DC-DC converter and the controller are free from a measurement of a current through the inductor and/or the switch of the respective phase circuits.

In embodiments, in the multiphase DC-DC converter at least one of the phase circuits the upper branch switching unit includes or consists of a diode that includes a reverse recovery time that is sufficiently large to reverse the inductor current $I_L$ after the inductor current $I_L$ has returned to zero, such that the reversed current discharges a capacitance of the switch and of a freewheeling diode and of a parallel capacitance, if present, before turning on the switch.

This allows for zero voltage switching of the switch even in regard of capacitances inherent in the switch and/or freewheeling diode, and more generally of capacitances that can be added in parallel to the switch, for example to reduce switching losses.

In embodiments, the reverse recovery time is sufficiently large for the reversed current to also discharge a capacitor arranged parallel to the switch before turning on the switch.

Further embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the figures.

Figure 1:
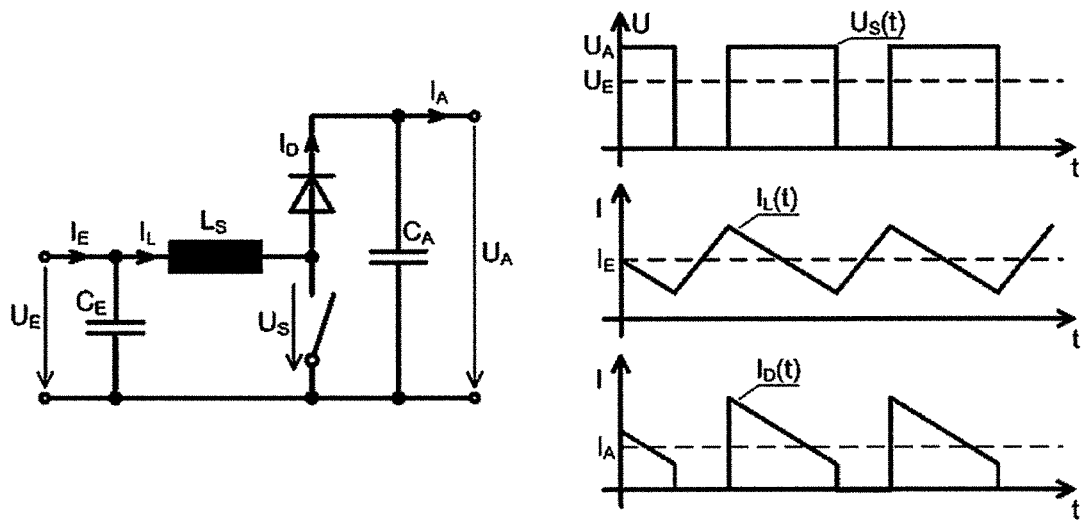
FIG. 1 a prior art DC-DC boost converter and typical values in CCM operation.
Figure 2:
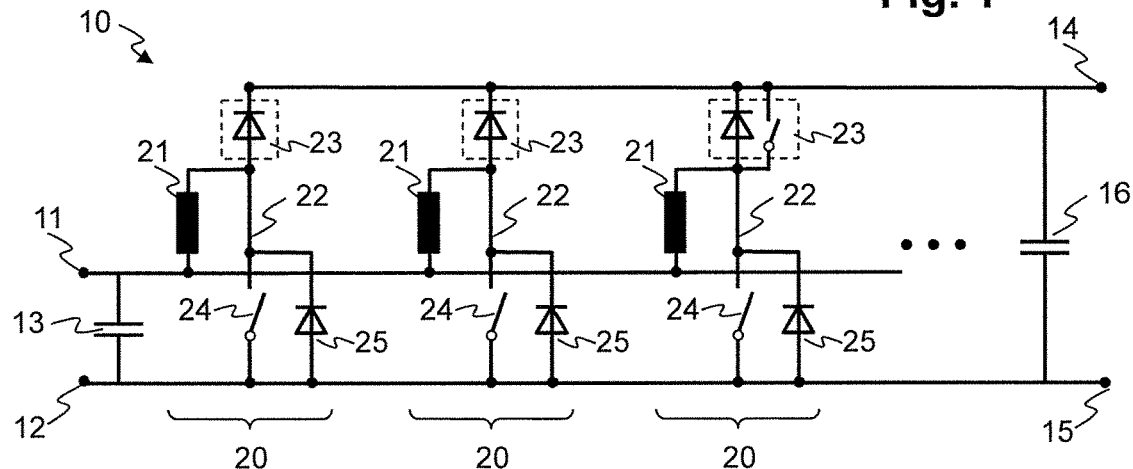
FIG. 2 a multiphase DC-DC converter.

FIG. 2 shows a multiphase DC-DC converter 10. It includes, at an input side, a first input terminal 11 and second input terminal 12, with an input capacitance 13 arranged between the two input terminals. At an output side, it includes a first output terminal 14 and a second output terminal 15, with a output capacitance 16 arranged between the two output terminals. Two or more phase circuits 20 are arranged to connect the input and output terminals. In the present embodiment, the phase circuits 20 are boost converters, each with an inductor 21 arranged between the first input terminal 11 and a bridge point 22, an upper branch switching unit 23 constituted by a diode arranged between the bridge point 22 and the first output terminal 14, and a switch 24 with a freewheeling diode 25 arranged between the bridge point 22 and the second input terminal 12 and second output terminal 15. The switch 24 typically is a semiconductor switch, for example, a MOSFET, SiC, IGBT, GaN or other known switch type.

The figures show the upper branch switching unit 23 constituted by a diode, in other words, the upper branch switching unit 23 essentially is a diode. In other embodiments, the upper branch switching unit 23 includes variants such as an active switch in parallel with a diode (shown in the rightmost phase circuit 20 of FIG. 2 in an exemplary fashion, in reality, all phase circuits 20 typically have upper branch switching units 23 of the same kind), or as an active switch alone (not shown).

The expression "arranged between" means that the respective element connects two points in the circuit, and can carry a current between the two points, depending on the state of the element.

A controller 40 is arranged to control switching of the switches 24 and to measure, e.g., voltages and currents in the multiphase DC-DC converter 10, using sensors not shown in the figure. The controller 40 can be configured to control a current delivered to the output side to follow a total current set point. Such a set point can be determined by a supervisory control loop, depending on the circumstances under which the multiphase DC-DC converter 10 is operated.

The total current delivered to the output side is the sum of phase currents delivered by the phase circuits 20. The phase circuits 20 are operated to generate interleaved current pulses, in order to minimise a ripple in the total current. Depending on the required total current, according to the total current set point, the controller 40 can determine an optimal number of phase circuits 20 to be active, so that the total current is delivered while each of the phase circuits 20 operates in an optimal or near optimal condition, for example with regard to switching losses.

Figure 3:
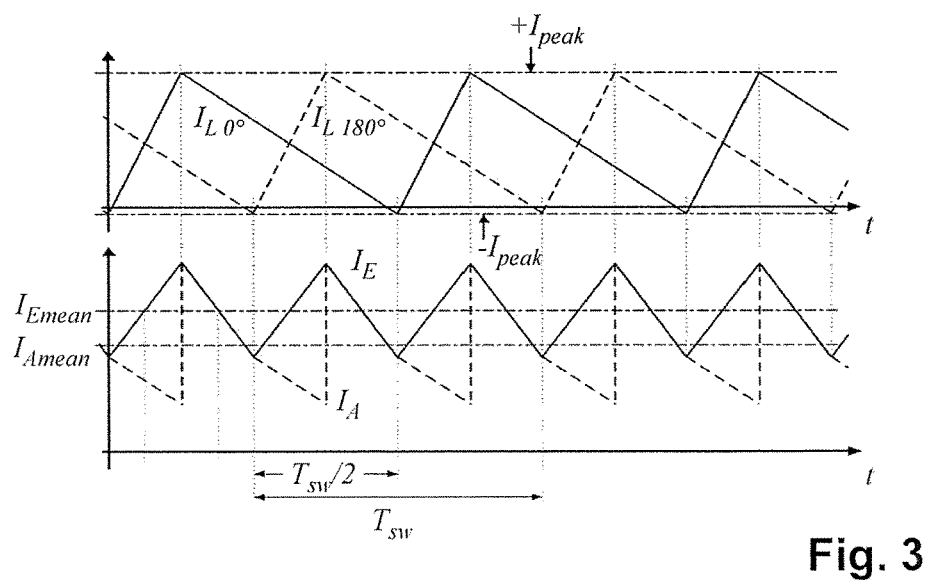
FIG. 3 the interleaving of current pulses.

FIG. 3 shows the interleaving of current pulses with two phase circuits 20 being active. The top graph shows the inductor currents $I_L$ of the two phase circuits 20 being operated in BCM. In each of the successive current pulses, the inductor current $I_L$ rises to a positive peak value $+I_{peak}$ while the respective switch 24 is closed, driven by the input voltage across the inductor 21 and flowing through the switch 24. While the switch 24 is open, the inductor current $I_L$ decreases again, driven by the difference between the output and input voltage across the inductor 21. While the switch 24 is open, the inductor current $I_L$ flows through the upper branch switching unit 23 and constitutes the phase current delivered to the output side. The decreasing inductor current $I_L$ is allowed to go below zero, to a negative peak value $-I_{peak}$ before the switch 24 is closed again. This allows for zero voltage and/or zero current switching of the switch 24, as is explained further below.

The bottom graph shows the output current $I_A$ resulting from the addition of the two phase currents. This output current $I_A$ is filtered by the output capacitance 16. Its mean current $I_{Amean}$ can be controlled according to the total current set point. The input current $I_E$ with mean value $I_{Emean}$ is also shown. It is evident that for a switching frequency corresponding to a switching time period $T_{SW}$ in each phase circuit 20, the output current has a period of $T_{SW}/2$ and the input current has a period of $T_{SW}/2$ of the variation about its respective mean, corresponding to its respective ripple frequency. The ripple frequencies increase according to the number of active phase circuits 20.

Figure 4:
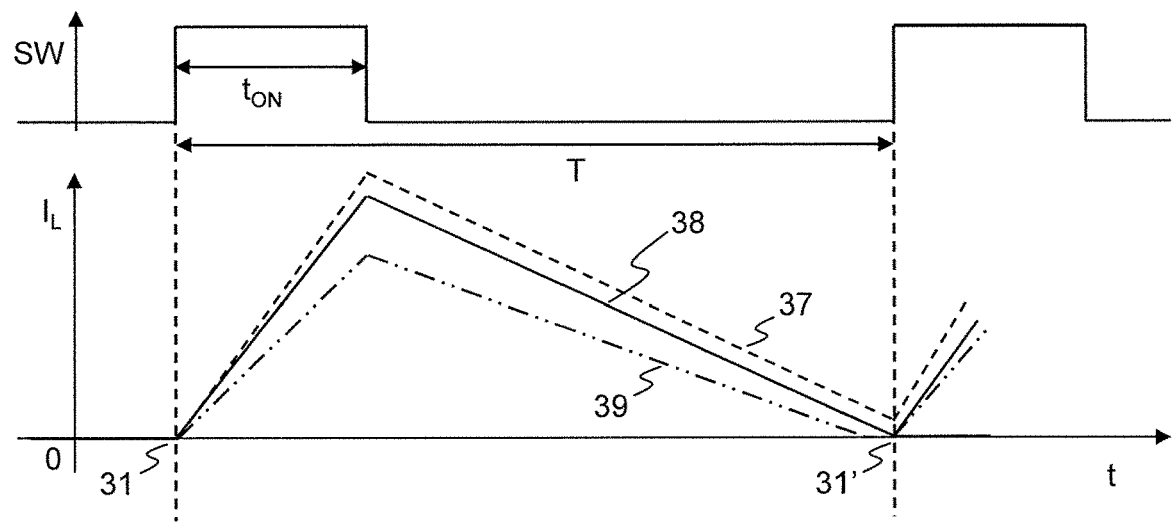
FIG. 4 different trajectories of an inductor current $I_L$.

FIG. 4 shows, for a phase circuit 20, different trajectories over time of an inductor current $I_L$, together with a state SW of the corresponding switch 24. When SW is high, the switch 24 is closed, i.e., in a conducting state. When SW is low, the switch 24 is open, i.e., in a non-conducting state. Given a period length T (corresponding to a switching frequency) between a turn-on time 31 and a next turn-on time 31', a turn-on time period $t_{on}$ during which the switch 24 is closed is to be chosen such that the phase circuit 20 operates in BCM. This is illustrated by the BCM mode trajectory 38 in which the returns to zero at the next turn-on time 31'.

The turn-on time period $t_{on}$ and the period length T are calculated such that a mean current to be delivered is generated and the current will return to zero at the end of the period length T. This requires only knowledge of the inductance value of the inductor 21, and is further determined by the input voltage and the mean current to be delivered by the phase circuit 20.

In more detail, the turn-on time period $t_{on}$ of a phase circuit 20 can be computed as $$t_{on} = \frac{2 \cdot I_{mean} \cdot L}{U_{IN}}$$

wherein
  $U_{IN}$ is the voltage at the input side, which can be measured;
  L is the inductance value of the inductor 21, which can be known, by the design of the inductor 21, or by measurements; and
  $I_{mean}$ is the mean current to be delivered by the phase circuit 20. which can be given, e.g., by the controller 40.

The period length T can be computed as $$T = t_{on} \frac{U_{OUT}}{U_{OUT} - U_{IN}}$$

wherein $U_{OUT}$ is the voltage at the output side.

If two or more phase circuits 20 are to operate synchronously, with a phase shift of their respective phase currents according to the number of active phase circuits 20, then their period lengths T should be the same. The period length T to be used for all phase circuit 20 can be determined by different approaches:

In an embodiment, one phase circuit 20 is designated as Master, and the others as Slaves. The Master is operated to run in "self-synchronised" mode. That is, the ideal period length T, computed as shown above is not reached exactly, but is determined by the actual time at which the inductor current $I_L$ reaches zero.

The period length T determined in this manner by the Master is then used for the Slave phase circuits 20.

In another embodiment, the controller 40 determines the period length T for all the active phase circuits 20 together. This implies prescribing a mean output current for each of the phase circuits 20 according to the total current set point, and adapting the period length T and turn-on time periods $t_{on}$ for the phase circuits 20 accordingly.

In each of the different approaches, for any phase circuit 20 that is not operated in "self-synchronised" mode, there is the issue of operating it in BCM with a prescribed period length T:

With the turn-on time period $t_{on}$ computed as shown above, ideally, the BCM mode trajectory 38 should result. In reality, parameters of the phase circuit 20, in particular the inductance value, will not be perfectly correct, or will drift over time.

If the real inductance value is lower than expected, or due to other deviations, a CCM mode trajectory 37 will be realised: while the switch 24 is closed, the inductor current $I_L$ will rise more than expected. At the end of the period length T, at the next turn-on time 31', the switch 24 is turned on again before the inductor current $I_L$ has returned to zero. Over several periods, the inductor current $I_L$ will keep rising. This is not acceptable.

If the real inductance value is higher than expected, or due to other deviations, a DCM mode trajectory 39 will be realised: while the switch 24 is closed, the inductor current $I_L$ will rise less than expected. At the end of the period length T, at the next turn-on time 31', the switch 24 is turned on again after the inductor current $I_L$ has returned to zero. Depending on the corresponding delay, electromagnetic disturbances and switching losses will arise.

In order to keep avoid the phase circuit 20 operating in either CCM or DCM, and keep it in BCM, the period $t_{on}$ is controlled: rather than switching the switch 24 on at the predetermined next turn-on time 31', it is switched on as for self-synchronised operation, that is, after the inductor current $I_L$ has returned to zero. The time at which it is switched on is compared to the predetermined next turn-on time 31', and the turn-on time period $t_{on}$ is adapted according to the different in time. A controller such as a PID controller can be used, and more generally, a controller that brings a steady state error to zero. Consequently, over a sequence of periods, the turn-on time period $t_{on}$ is adapted so that the inductor current $I_L$ returns to zero at the desired respective next turn-on time 31', corresponding to the desired or predetermined period length T.

The period length T in turn can be adapted or varied by another, outer control loop, in order for the mean current of the phase circuit 20 and the total current of the multiphase DC-DC converter 10 to follow a variation in their corresponding set points.

If the total current actually delivered by the multiphase DC-DC converter 10 is not as it ideally should be, according to the above formulae, then the outer control loop can adapt the total current and thereby the mean current to be delivered by each phase. This will in turn cause the turn-on time period $t_{on}$ and the period length T to be adapted.

Figure 5:
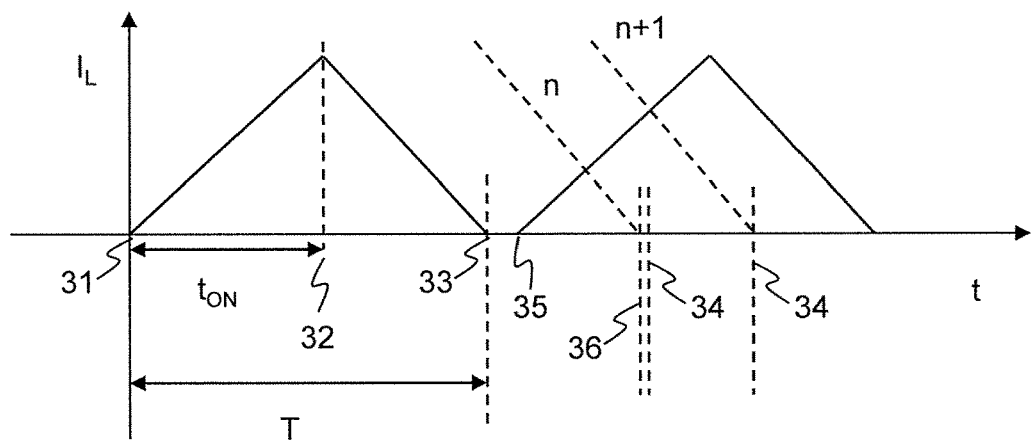
FIG. 5 pertinent points in time when controlling the multiphase DC-DC converter.

FIG. 5 shows pertinent points in time when controlling the multiphase DC-DC converter: inductor current pulses from one phase circuit 20, which can be a Master, are shown with drawn out lines, parts of other pulses, which can be Slaves, are shown with dashed lines. The beginning of a pulse in the Master is used as reference time 35 ($T_{ref}$) for the other pulses. For the n-th Slave, a target turn-on time 34 ($T_{target}$(n)) is determined as $T_{target}(n)-(T\cdot n)/N$. In operation of each phase circuit 20, the respective actual turn-on time 36 can deviate from the target turn-on time 34, and the controller as described above modifies, for the next period, the turn-on time period $t_{on}$.

If there is no Master phase and the period length T is prescribed for all active phase circuits 20, then all the active phase circuits 20 are operated as Slaves.

Figure 6:
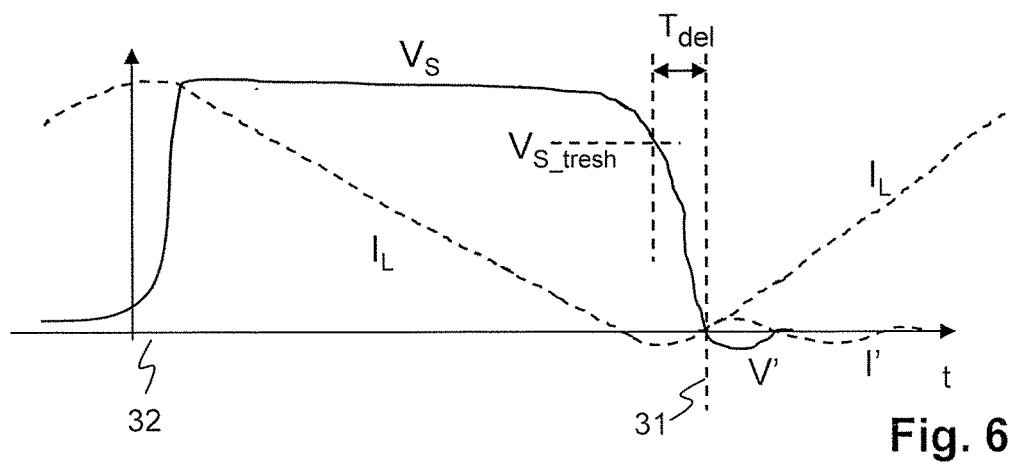
FIG. 6 voltage and current trajectories for a switch of a phase circuit.

The situation illustrated in the previous figures, and the calculations for determining the period length T and turn-on time period $t_{on}$ are approximations that do not consider the detailed current trajectory just before and after the turn-on time 31. This is acceptable since on the one hand the charges and currents involved in the switching operation, as explained in the context of FIG. 6, are much smaller than those over an entire period. On the other hand, small errors resulting from the approximation will be corrected by the control of the turn-on time period $t_{on}$.

FIG. 6 shows a trajectory of the inductor current $I_L$ and the voltage $V_S$ across the switch 24 of a phase circuit 20. The voltage $V_S$ across the switch 24 is the same as the voltage of the bridge point 22. At the turn-off time 32, the voltage rises and the current begins to decrease, flowing through the switch 24 and the upper branch switching unit 23.

According to an embodiment, the switch 24 is turned on after the inductor current $I_L$ has become zero: The inductor current $I_L$, driven by the difference between the input and output voltages, becomes negative to an extent depending on the time at which the upper branch switching unit 23 is turned off. In the case in which the upper branch switching unit 23 is constituted by a diode, this time depends on the reverse recovery charge of the diode. When the upper branch switching unit 23 blocks the inductor current $I_L$, it commutates to the freewheeling diode 25 of the switch 24. The freewheeling diode 25 becomes conducting and the voltage $V_S$ across the switch drops to zero. When the voltage is zero, the switch 24 is switched on at turn-on time 31. Ideally at this instant the inductor current $I_L$ has returned to zero again. As a result, the switch 24 is turned on at zero current, reducing EMC disturbances, and zero voltage, reducing switching losses. The figure shows, in addition to the inductor current $I_L$ rising again after the turn-on time 31, trajectories I' and V' that the current and voltage would take if the switch 24 were not turned on.

Thus, the switching on can be triggered by a threshold detection of the voltage $V_S$ across the switch 24. The switching can be triggered when the voltage $V_S$ is zero. Or the switching can be triggered a predetermined time delay $T_{del}$ after the voltage $V_S$ across the switch 24 falls under a predetermined threshold $V_{S\_tresh}$ that is larger than zero. The predetermined time delay and threshold can be determined according to the parameters of the phase circuit, and stored in the controller 40. Triggering on the basis of the threshold $V_{S\_tresh}$ that is larger than zero moves the point at which the threshold is crossed to an earlier point in time and so allows to compensate for processing time required by the controller 40. Alternatively, the switching on can be triggered by threshold detection of the voltage at the bridge point 22, which usually is identical to the voltage $V_S$ across the switch 24.

Alternatively, the switching on can be triggered by threshold detection of the inductor current $I_L$. For this, inductor current $I_L$ itself can be monitored, or the current through the upper branch switching unit 23, since prior to commutation it is the same as the inductor current $I_L$. The inductor current $I_L$ can be monitored by monitoring the magnetic field of the inductor 21.

In order for the current and voltage to be zero or near zero at the same time, a diode constituting the upper branch switching unit 23 can be chosen to have a corresponding reverse recovery time. The reverse recovery time determines the time during which the inductor current $I_L$ is negative. The diode is chosen such that for nominal operation conditions the current and voltage are zero at the same time.

Figure 7:
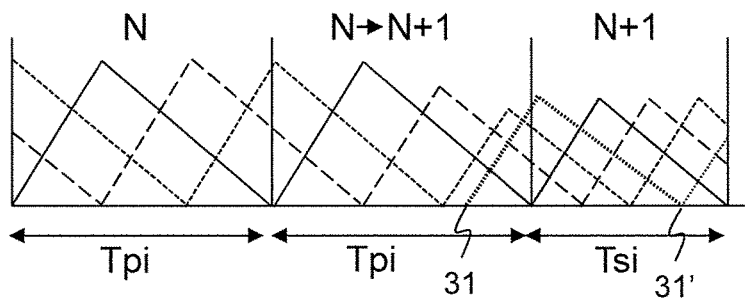
FIG. 7 activation of an additional phase circuit and insertion of its current pulses into a sequence of interleaved pulses.

FIG. 7 shows activation of an additional phase circuit and insertion of its current pulses into a sequence of interleaved pulses. Given a total current set point, in a pre-transition period the current pulses are higher and the period length Tpi is longer than in a post-transition period with period length Tsi. A transition period has the same period length Tpi as the pre-transition period and coincides with the pulse period of a phase that is designated as the Master. The other phases already active (Slaves) are operated to be
- switched on in the transition period, with turn-on times (relative to the period) as in the pre-transition period, and
- their turn-on time period $t_{on}$ is chosen so that their next turn-on time (at which the current returns to zero) is as required in the post-transition period.

The new phase circuit 20 being activated is inserted to be last in the post-transition phase, after the last of the Slave phases and before the Master phase. Its next turn-on time 31' is as required in the post-transition period. Its only free parameter is its turn-on time period $t_{on}$: The turn-on time period $t_{on}$ determines its period length T which in turn, going backwards in time from the next turn-on time 31', determines the first turn-on time 31 when activating the new phase circuit 20. The turn-on time period $t_{on}$ is chosen such that the total current of all phase circuits 20 is minimises its deviation from the total current set point.

Figure 8:
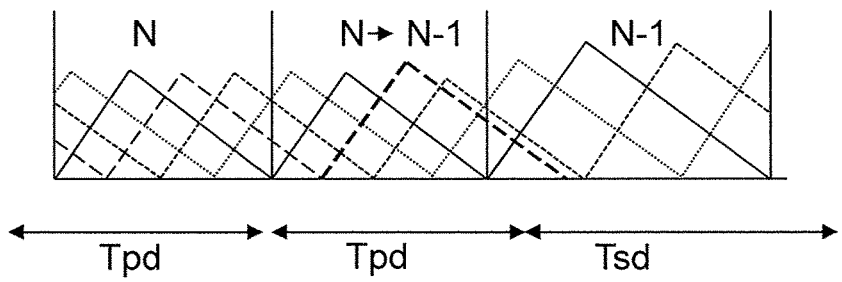
FIG. 8 deactivation of a phase circuit and removal of its current pulses from a sequence of interleaved pulses.

FIG. 8 shows deactivation of a phase circuit and removal of its current pulses from a sequence of interleaved pulses. Given a total current set point, in a pre-transition period the current pulses are lower and the period length Tpd is shorter than in a post-transition period with period length Tsd. A transition period has the same period length Tpd as the pre-transition period and coincides with the pulse period of a phase that is designated as the Master. The other phases (Slaves) except the one following the Master are operated to be
- switched on in the transition period, with turn-on times (relative to the period) as in the pre-transition period, and
- their turn-on time period $t_{on}$ is chosen so that their next turn-on time (at which the current returns to zero) is as required in the post-transition period.

The phase circuit 20 following the Master is also, like the other Slaves, switched on with a turn-on time 31 as in the pre-transition period. Here too, its only free parameter for shaping the last pulse is its turn-on time period $t_{on}$: The turn-on time period $t_{on}$ determines the period length T and the point at which its current returns to zero, ending the last pulse. The turn-on time period $t_{on}$ is chosen such that the total current of all phase circuits 20 is minimises its deviation from the total current set point.

Figure 9:
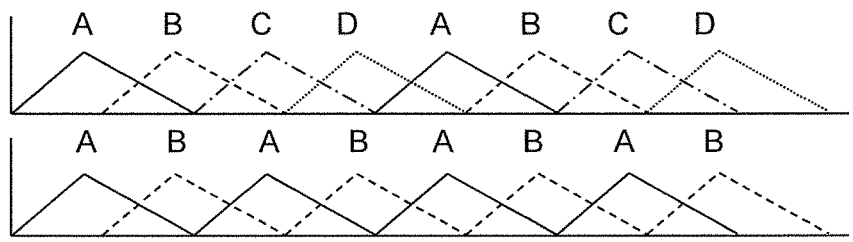
FIG. 9 switching between DCM and BCM and vice versa.

FIG. 9 shows switching between DCM and BCM and vice versa: the upper diagram shoes four phase circuits A, B, C, D operating in DCM and pairwise. In each pair (A-C and B-D), the two phase circuits generate alternating pulses, with one phase circuit (A or B) generating a current pulse while the other one (C or D) provides no current, and vice versa. The pulses from the two pairs are interleaved. Switching to BCM can be done individually in each pair, by deactivating one of the two phase circuits (C and D) and operating the other one (A and B) to generate both pulses in BCM. The pattern of the total current remains the same.

Switching from BCM to DCM can be done in an analogous way, i.e., by switching one phase circuit 20 from BCM to DCM and thereby omitting alternating pulses, and activating another phase circuit 20 to supply the omitted pulses.

More generally (not illustrated), in the same way an integer multiple of phases operating in DCM to generate a sequence of adjacent pulses can be replaced by a single phase operating in BCM, and vice versa.

Such a switch from BCM to DCM or vice versa can be applied in conditions where the load, or required total current requires it. For example, when a relatively small current is required, the maximum frequency or minimum turn-on time period $t_{on}$ may not allow for BCM, and thus DCM must be used.

Figure 10:
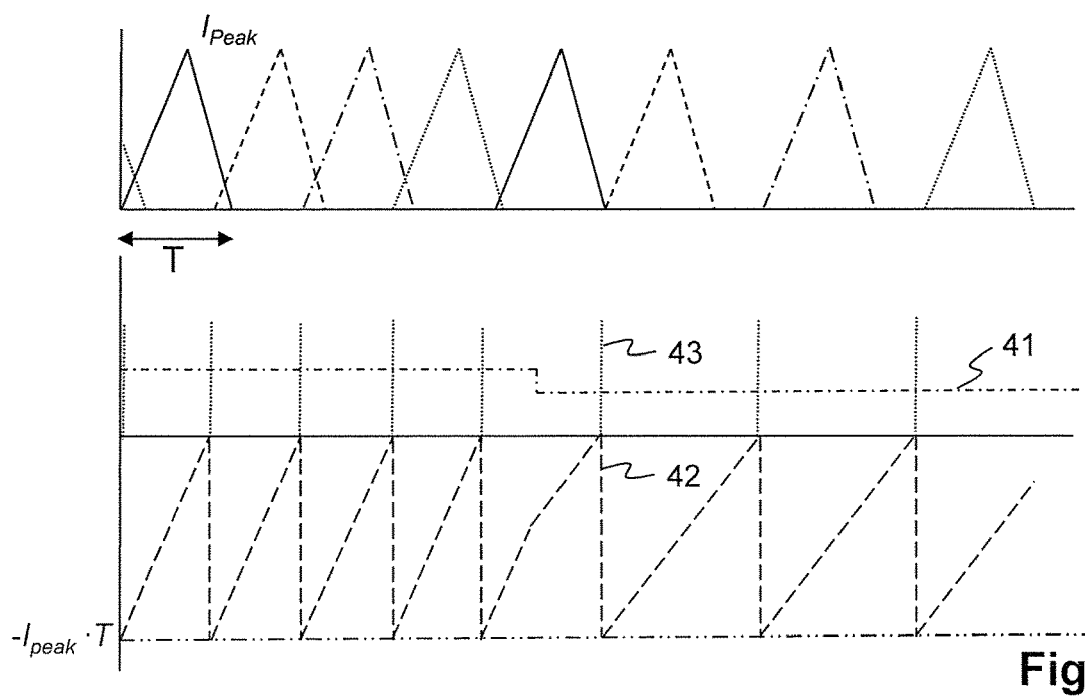
FIG. 10 a method for controlling the converter in DCM.

FIG. 10 shows a method for controlling the multiphase DC-DC converter 10 in DCM. Its purpose is to trigger pulses from one or more phase circuits 20 operating in DCM, given a total current set point to be delivered by the converter. A sequence of phase current pulses of essentially the same shape is generated in the following way:
- a peak current $I_{Peak}$ and period length T, defining the shape of the pulses, is determined;
- an integrator is initialised with a value corresponding to the product of the peak current $I_{Peak}$ and the period length T;
- a current pulse with the peak current $I_{Peak}$ and period length T is triggered in one of the phase circuits 20;
- the integrator integrates the total current set point value 41, with its integrator output 42 running towards zero;
- when the integrator output 42 reaches zero, a next current pulse in another phase circuit 20 is triggered by a trigger pulse 43, the integrator is initialised again, and the procedure continues with the preceding step.

Limits for ranges in which the peak current $I_{Peak}$ and period length T can be chosen depend on the hardware and operation considerations. Relevant parameters for the choice can be a maximum switching frequency, minimal pulse length, switching losses.

The trigger pulses 43 are multiplexed over the active phase circuits 20. The sum of the current pulses will correspond to the total current set point 41. Thanks to the simple structure, the total current set point 41 can be tracked with low latency.

The example in FIG. 10 shows the integrator being initialised to a negative value and then integrating in the positive direction. It is understood that the same principle can be realised with inverted signs and with differently scaled values of the signals involved.

In typical applications, the following values can be present for the
- period length T: corresponding to a frequency of 10 kHz to 700 kHz, in particular of 20 kHz to 400 kHz.
- number of phases N: 6 to 12 phases.
- peak current per phase: up to 120 A or up to 200 A or more.
- mean current per phase: up to 60 A or up to 100 A or more.
- total current: up to 600 A, up to 800 A or more.
- output voltage: 200 V to 800 V.
- inductance value of the inductor 21: 5 to 20 micro-H or 8 to 15 micro-H, While the invention has been described in present embodiments, it is distinctly understood that the invention is not limited thereto, but may be otherwise variously embodied and practised within the scope of the claims.

The invention claimed is:

1. A control method for controlling a multiphase DC-DC converter the multiphase DC-DC converter being arranged for exchanging electrical power between an input side, comprising a first input terminal and a second input terminal, and an output side, comprising a first output terminal and a second output terminal, the multiphase DC-DC converter comprising two or more phase circuits,
   each phase circuit comprising a switch and an inductor, the switch being arranged to control an inductor current $I_L$ through the inductor,
   the phase circuit being arranged to generate a phase current contributing to a total current to be delivered to an output side of the multiphase DC-DC converter, the method comprising:
   switching two or more of the phase circuits in Boundary Conduction Mode (BCM) to generate interleaved phase current pulses, with a period length T and a turn-on time period $t_{on}$ of the switch;
   in at least one of the two or more of the phase circuits being switched, and for successive phases, repeatedly adapting the turn-on time period $t_{on}$ for controlling the length of the pulses of the inductor current $I_L$ to minimise a difference from the period length T;
   each phase circuit comprising the inductor being connected between the first input terminal and a bridge point, an upper branch switching unit connected between the bridge point and the first output terminal, and the switch with a parallel freewheeling diode being connected between the bridge point and the second input terminal and second output terminal,
   the control method comprising the steps of:
   determining a number N of phase circuits to be active, N being a positive integer;
   determining an initial value for the turn-on time period $t_{on}$;
   determining the period length T;
   for at least one of the phase circuits that are to be active:
   (A) turning on the switch of the phase circuit, causing an inductor current $I_L$ to increase over time, and determining a target turn-on time when the switch shall be turned on a next time;
   (B) after the turn-on time period $t_{on}$, switching off the switch, causing the inductor current
   (C) $I_L$ to flow through the upper branch switching unit and decrease over time;
   (D) after the inductor current $I_L$ has returned to zero, at a zero crossing time, turning the switch on again and repeating the steps (A)-(C); and
   (E) when repeating the steps (A)-(C), controlling the turn-on time period $t_{on}$ by increasing the turn-on time period $t_{on}$ if the zero crossing time is before the target turn-on time and by decreasing the turn-on time period ton if the zero crossing time is after the target turn-on time.

2. The control method of claim 1, wherein an initial value for the turn-on time period $t_{on}$ of a phase circuit is computed as:

$$t_{on} = \frac{2 \cdot I_{mean} \cdot L}{U_{IN}}$$

wherein $U_{IN}$ is a voltage at the input side, L is an induction value of the inductor and $I_{mean}$ is a mean current to be delivered by the phase circuit.

3. The control method of claim 1, wherein in active phase circuits, a respective period length T is computed as $$T = t_{on} \frac{U_{OUT}}{U_{OUT} - U_{IN}}$$

wherein $U_{OUT}$ is a voltage at the output side.

4. The control method of claim 1, wherein the step of determining the target turn-on time comprises computing the target turn-on time as being offset from a reference time by the period length T divided by the number N of phase circuits that are active.

5. The control method of claim 1, wherein the step of turning the switch on again comprises one of:
   monitoring a voltage across the switch and turning on the switch when the voltage across the switch is zero;
   monitoring the voltage across the switch, and turning on the switch a predetermined time delay after the voltage across the switch falls under a predetermined threshold;
   monitoring the inductor current $I_L$ and turning on the switch when the inductor current $I_L$ becomes zero after having been negative due to a reverse current through the upper branch switching unit;
   monitoring a current through the upper branch switching unit, in particular a diode current, and turning on the switch when the current through the upper branch switching unit becomes zero after having been negative due to a reverse current through the upper branch switching unit.

6. The control method of claim 1, wherein the step of turning the switch on again comprises:
   when the inductor current $I_L$ has returned to zero, letting the inductor current $I_L$ flow in a reverse direction and continue to flow through the inductor and the upper branch switching unit until the upper branch switching unit is turned off and the inductor current $I_L$ commutates to the freewheeling diode;
   turning on the switch;
   wherein the upper branch switching unit is constituted by a diode, or comprises a diode, and is turned off by a reverse charge in the diode having built up, and in wherein a reverse charge of the diode is chosen so that a reverse current through the diode is sufficient to discharge capacitances between the bridge point and the second input terminal.

7. A multiphase DC-DC converter, comprising a controller comprising voltage sensors arranged for determining a voltage $U_{IN}$ at the input side, a voltage $U_{OUT}$ at the output side and a voltage $U_L$ across the inductor of each phase circuit, the controller being configured to perform the method of claim 1, wherein in at least one of the phase circuits the upper branch switching unit comprises or consists of a diode that comprises a reverse recovery time that is sufficiently large to reverse the inductor current $I_L$ after the inductor current $I_L$ has returned to zero, such that the reversed current discharges a capacitance of the switch and of a freewheeling diode and of a parallel capacitance, before turning on the switch.

8. The multiphase DC-DC circuit of claim 7, wherein the reverse recovery time that is sufficiently large for the reversed current to also discharge a capacitor arranged parallel to the switch before turning on the switch.

9. A control method for controlling a multiphase DC-DC converter the multiphase DC-DC converter being arranged for exchanging electrical power between an input side an output side, the multiphase DC-DC converter comprising two or more phase circuits, each phase circuit comprising a switch and an inductor, the switch being arranged to control an inductor current $I_L$ through the inductor, the phase circuit being arranged to generate a phase current contributing to a total current to be delivered to an output side of the multiphase DC-DC converter, the method comprising:

switching two or more of the phase circuits in Boundary Conduction Mode (BCM) to generate interleaved phase current pulses, with a period length T and a turn-on time period $t_{on}$ of the switch;

in at least one of the two or more of the phase circuits being switched, and for successive phases, repeatedly adapting the turn-on time period $t_{on}$ for controlling the length of the pulses of the inductor current $I_L$ to minimise a difference from the period length T, the method further comprising, for increasing the number N of phase circuits that are active to N+1, given a total current set point, in a pre-transition period of length Tpi, switching the switches of the N phase circuits to turn on at turn-on times, relative to the pre-transition period, of 0, dTpi, 2·dTpi, 3·dTpi ... (N−1)·dTpi where dTpi=Tpi/N;

computing, for a post-transition period of length Tsi, target turn-on times for the N+1 phase circuits, relative to the post-transition period, as 0, dTsi, 2·dTsi, 3·dTsi ... N·dTsi where dTsi=Tsi/(N+1);

in a transition period, switching the switches of the N phase circuits to turn on at the same turn-on times, relative to the transition period, as in the pre-transition period;

in the transition period, for each of the N phase circuits, setting the turn-on time periods $t_{on}$ so that the inductor current $I_L$ returns to zero at the respective target turn-on time in the post-transition period;

in the transition period, after the turn-on time at (N−1)·dTpi, turn on the switch of a newly operated (N+1)th at a time and with the turn-on time period $t_{on}$ such that a deviation of a total current of all phase circuits in the transition period and the post-transition period from the total current set point is minimised.

10. A control method for controlling a multiphase DC-DC converter the multiphase DC-DC converter being arranged for exchanging electrical power between an input side an output side, the multiphase DC-DC converter comprising two or more phase circuits, each phase circuit comprising a switch and an inductor, the switch being arranged to control an inductor current $I_L$ through the inductor, the phase circuit being arranged to generate a phase current contributing to a total current to be delivered to an output side of the multiphase DC-DC converter, the method comprising:

switching two or more of the phase circuits in Boundary Conduction Mode (BCM) to generate interleaved phase current pulses, with a period length T and a turn-on time period $t_{on}$ of the switch;

in at least one of the two or more of the phase circuits being switched, and for successive phases, repeatedly adapting the turn-on time period $t_{on}$ for controlling the length of the pulses of the inductor current $I_L$ to minimise a difference from the period length T, the method further comprising, for decreasing the number N of phase circuits that are active to N−1, given a total current set point, in a pre-transition period of length Tpd, switching the switches of the N phase circuits to turn on at turn-on times, relative to the pre-transition period, of 0, dTpd, 2·dTpd, 3·dTpd ... (N−1)·dTpd where dTpd=Tpd/N;

computing, for a post-transition period of length Tsd, target turn-on times for the N−1 phase circuits, relative to the post-transition period, as 0, dTsd, 2·dTsd, 3·dTsd ... (N−2)·dTsd where dTsd=Tsd/(N−1);

in a transition period, switching the switches of the N phase circuits to turn on at the same turn-on times, relative to the transition period, as in the pre-transition period;

in the transition period, for each of the N phase circuits, except for the phase circuit whose target turn on time relative to this period is dTpd, setting the turn-on time periods $t_{on}$ so that the inductor current $I_L$ returns to zero at the respective target turn-on time in the post-transition period;

in the transition period, for the phase circuit whose target turn on time relative to this period is dTpd, setting the turn-on time period $t_{on}$ for one last pulse of the phase circuit whose target turn on time relative to this period is dTpd, such that a deviation of a total current of all phase circuits in the transition period and the post-transition period from the total current set point is minimised.

11. A control method for controlling a multiphase DC-DC converter the multiphase DC-DC converter being arranged for exchanging electrical power between an input side an output side, the multiphase DC-DC converter comprising two or more phase circuits, each phase circuit comprising a switch and an inductor, the switch being arranged to control an inductor current $I_L$ through the inductor, the phase circuit being arranged to generate a phase current contributing to a total current to be delivered to an output side of the multiphase DC-DC converter, the method comprising:

switching two or more of the phase circuits in Boundary Conduction Mode (BCM) to generate interleaved phase current pulses, with a period length T and a turn-on time period $t_{on}$ of the switch;

in at least one of the two or more of the phase circuits being switched, and for successive phases, repeatedly adapting the turn-on time period $t_{on}$ for controlling the length of the pulses of the inductor current $I_L$ to minimise a difference from the period length T, the method further comprising, for a transition between operation of the multiphase DC-DC converter in discontinuous conduction mode to boundary conduction mode, for one or more sets of np phase circuits each, np being two or more, for each of said sets:

operating the respective np phase circuits of the set in discontinuous conduction mode to generate a sequence of np pairwise adjacent current pulses of period length T, each phase circuit contributing one of the current pulses of the sequence;

not operating the respective np phase circuits of the set in discontinuous conduction mode, and instead operating one phase circuit in boundary conduction mode to continue the sequence of current pulses of period length T.

12. A control method for controlling a multiphase DC-DC converter the multiphase DC-DC converter being arranged for exchanging electrical power between an input side an output side, the multiphase DC-DC converter comprising two or more phase circuits, each phase circuit comprising a switch and an inductor, the switch being arranged to control an inductor current $I_L$ through the inductor, the phase circuit being arranged to generate a phase current contributing to a total current to be delivered to an output side of the multiphase DC-DC converter, the method comprising:

switching two or more of the phase circuits in Boundary Conduction Mode (BCM) to generate interleaved phase current pulses, with a period length T and a turn-on time period $t_{on}$ of the switch;

in at least one of the two or more of the phase circuits being switched, and for successive phases, repeatedly adapting the turn-on time period $t_{on}$ for controlling the length of the pulses of the inductor current $I_L$ to minimise a difference from the period length T, the method further comprising, for a transition between operation of the multiphase DC-DC converter in boundary conduction mode to discontinuous conduction mode, for one or more sets of np phase circuits each, np being two or more, for each of said sets:

operating one phase circuit in boundary conduction mode to generate a sequence of current pulses with period length T in boundary conduction mode;

not operating this one phase circuit in boundary conduction mode, and instead operating the respective np phase circuits of the set to continue the sequence of current pulses of period length T by operating the np phase circuits in discontinuous conduction mode to generate a sequence of np pairwise adjacent current pulses of period length T, each phase circuit contributing one of the current pulses of the sequence.

13. A control method for controlling a multiphase DC-DC converter the multiphase DC-DC converter being arranged for exchanging electrical power between an input side an output side, the multiphase DC-DC converter comprising two or more phase circuits, each phase circuit comprising a switch and an inductor, the switch being arranged to control an inductor current $I_L$ through the inductor, the phase circuit being arranged to generate a phase current contributing to a total current to be delivered to an output side of the multiphase DC-DC converter, the method comprising:

switching two or more of the phase circuits in Boundary Conduction Mode (BCM) to generate interleaved phase current pulses, with a period length T and a turn-on time period $t_{on}$ of the switch;

in at least one of the two or more of the phase circuits being switched, and for successive phases, repeatedly adapting the turn-on time period $t_{on}$ for controlling the length of the pulses of the inductor current $I_L$ to minimise a difference from the period length T, the method further comprising determining the period length T by operating one of the phase circuits, called master phase, with the turn-on time period $t_{on}$ that is determined according to a mean current to be delivered by the master phase circuit, and operating one or more of the remaining active phase circuits to adapt their timing and period length to that of the master phase.

* * * * *